TELEPHONE CABLE SYSTEM

Filed Feb. 1, 1962 8 Sheets-Sheet 1

INVENTORS
BILLY J. LOVITT
LUDWIK JACHIMOWICZ
ANDREW NOSTY

BY Emery Whittemore Sandoe & Graham
ATTORNEYS

INVENTORS
BILLY J. LOVITT
LUDWIK JACHIMOWICZ
BY ANDREW NOSTY

Emery Whittemore Sandoe & Graham
ATTORNEYS

Nov. 24, 1964 B. J. LOVITT ETAL 3,158,680

TELEPHONE CABLE SYSTEM

Filed Feb. 1, 1962 8 Sheets-Sheet 3

INVENTORS
BILLY J. LOVITT
LUDWIK JACHIMOWICZ
BY ANDREW NOSTY

Emery Whittemore Sandoe & Graham
ATTORNEYS

Nov. 24, 1964 B. J. LOVITT ETAL 3,158,680
TELEPHONE CABLE SYSTEM
Filed Feb. 1, 1962 8 Sheets-Sheet 4

INVENTORS
BILLY J. LOVITT
LUDWIK JACHIMOWICZ
ANDREW NOSTY
BY
Emery Whittemore Sandoe & Graham
ATTORNEYS

TELEPHONE CABLE SYSTEM

Filed Feb. 1, 1962 8 Sheets-Sheet 5

INVENTORS
BILLY J. LOVITT
LUDWIK JACHIMOWICZ
BY ANDREW NOSTY

Emery Whittemore Sandoe & Graham
ATTORNEYS

INVENTORS
BILLY J. LOVITT
LUDWIK JACHIMOWICZ
ANDREW NOSTY

BY

Emery Whittemore Sandoe & Graham

ATTORNEYS

TELEPHONE CABLE SYSTEM

Filed Feb. 1, 1962 8 Sheets-Sheet 7

INVENTOR.
BILLY J. LOVITT
LUDWIK JACHIMOWICZ
ANDREW NOSTY
BY
ATTORNEYS

INVENTORS
BILLY J. LOVITT
LUDWIK JACHIMOWICZ
BY ANDREW NOSTY

Emery Whittemore Sandoe & Graham
ATTORNEYS 3,158,680
Patented Nov. 24, 1964

3,158,680

TELEPHONE CABLE SYSTEM

Billy J. Lovitt, New Canaan, Conn., Ludwik Jachimowicz, Elizabeth, N.J., and Andrew Nosty, Elmhurst, N.Y.; said Lovitt assignor to General Telephone & Electronics Corporation, New York, N.Y., a corporation of New York; and said Jachimowicz and said Nosty assignors to General Cable Corporation, New York, N.Y., a corporation of New Jersey Filed Feb. 1, 1962, Ser. No. 170,435
8 Claims. (Cl. 174—88)

This invention relates to an improved telephone cable system and to improved connector components used in such systems.

Telephone cable conventionally comprises a plurality of insulated conductors arranged in pairs and bundled, stranded or cabled into a core. The core is customarily covered with a binding tape or belt, which may be of any one of a variety of materials, or a laminate of 2 or more materials. The outer covering of the cable may be of a single material such as an extruded plastic, lead, antimony alloyed lead, aluminum or other material. The outer covering may, in addition to the foregoing, consist of a number of elements, such as a metallic shield directly over the taped and belted core, and an outer jacket of plastic.

The number of pairs varies with the application and may be as high as 2800 or more. However, this application is primarily concerned with cables having 400 pairs and less.

In recent years, there has been introduced to the art composite cable which consists of the required number of pairs insulated with color coded high molecular weight polyethylene, the pairs assembled into a core, the core covered by a core tape and a longitudinal aluminum shield, and the shielded core and a weatherproof compound filled and coated galvanized steel messenger strand simultaneously sheathed with an extruded covering of black high molecular weight polyethylene, said shielded core and messenger strand being positioned, each with respect to the other, by a web of polyethylene which joins the two annular walls of polyethylene lying over the shielded core and messenger strand. Viewed in end section the finished cable assumes the approximate shape of a figure 8. Such cable is generally known as "figure 8" cable, and is specifically designed for aerial installation.

The composite cable may be installed rapidly from pole to pole since it is necessary merely to strip the jacket from the messenger cable ends and to string up the entire assembly by suitable end clamps and intermediate clamps applied to the upper position of the cable which contains the messenger strand.

Prior to the development of figure 8 types, telephone cables were not designed to be self-supporting when used in aerial plant. Cables not of the figure 8 type are attached to messenger strands, which serve as the supporting strength member, by closely spaced clamps, clips, rings, or other securing devices or by an open helical wrap of wire or tape.

A present practice is to string the messenger strand from pole to pole in one operation, and to place the telephone cable and secure it to the messenger strand, using one of the methods described above, in a second operation. In this manner, cable may be installed with relative rapidity, with a crew putting up several miles of cable per day.

Unfortunately, however, jointing between lengths of installed telephone cable is relatively time-consuming with any existing telephone cable system. The present practice for jointing telephone cables comprises opening the ends of adjacent cable lengths. The individual conductors in the cables must then be associated with the corresponding conductors in the adjacent cable length. The individual conductors must then be spliced and the splice insulated. For example, conductors are often spliced by removing the insulation from the conductor ends being jointed, twisting the bare conductor ends together in pigtails, soldering the pigtail, and sliding a plastic sleeve filled with silicone compound over the joint.

The jointing of cables requires skilled workmen employed at high rates of pay and is, due to the large number of conductive pairs in each cable, slow and tedious work. The slow jointing is particularly objectionable since it must be performed out-of-doors in all weather and up in the air. Thus, in many cases, it is necessary to build temporary enclosures, suspended from the poles or suspension cables, for the men making the cable joint both to protect the men and the cable joint from the weather. In addition to the fact that cable jointing is necessarily slow, the working conditions are such as to make a perfect joint a matter of skill and equipment.

In addition to the direct expense of utilizing skilled labor for jointing, the present practice of installation suffers from hidden costs which are often equal to, if not greater than, the direct labor expense. For example, since the jointing crews often cannot approach a rate of production which would allow them to keep pace with the cable stringing crews, many miles of cable may be strung and remain inoperative for extended periods until the jointing crews catch up. Thus, the capital investment in the strung cable can remain non-productive until the cable is jointed and charges can be made for use thereof.

Further, when loading coils or repeaters are installed in telephone lines, they must be laboriously coupled to the cable system by techniques similar to those mentioned above. Since such components are required at periodic intervals, the overall rate of cable installation can be further adversely affected.

Similarly, when a large telephone cable is split into branches, the installation crew must carefully open the cable, separate the conductors to provide the desired branching, and after coupling all the conductors to the branch line, reseal the joint.

It is, therefore, the primary object of the present invention to provide an improved telephone cable system which can be installed in an operative system within a shorter time than is possible in accordance with the present practice.

It is a further object of this invention to provide a telephone cable system in which manufactured lengths of cable are provided with electrical receptacle and plug assemblies so that adjacent lengths of installed cable can be connected merely by plugging them together in the field.

It is a further object of this invention to provide an improved telephone cable system in which system components such as loading coils and repeaters can be installed in the telephone system merely by plugging adjacent cable lengths into the components.

It is a further object of this invention to provide a telephone cable system in which access to individual conductors may be had for test purposes in simple and economical fashion.

It is a further object of this invention to provide an improved multi-contact connector for telephone cable in which the connector is small, weather-tight, capable of use over an extended operative life time, and is capable of withstanding high voltage surges of the order of 10,000 volts or more between adjacent contacts of the connector.

It is a further object of this invention to provide a connector which will be tight against gas pressure introduced in the telephone cable.

It is a further object of this invention to provide a connector for telephone cables which will provide an electrical path between the metallic shields of adjacent cable lengths, will provide a gas-tight seal on each cable length, and will provide means for coupling the gas pressure in one cable length to an adjacent cable length.

It is a further object of this invention to provide a telephone cable having connectors at the ends thereof which may be installed in the field merely by placing the cable and plugging together adjacent cable lengths.

It is a still further object of this invention to provide an improved composite telephone cable having an integrally formed telephone cable and messenger strand, and in which each formed length of the cable is provided with receptacle and plug at opposite ends thereof.

In accordance with these objects, there is provided, in a preferred embodiment of this invention, a manufactured length of telephone cable having the desired plurality of conductor pairs assembled in a core which is shielded and sheathed in accordance with conventional practices. At the end of each cable length the telephone cable is provided with a connector providing a plurality of individual contacts to which the conductors are electrically coupled. Thus, for installation of such cable, adjacent lengths need merely be placed and plugged into the matching connector on the end of the adjacent cable length.

To provide a structural member for support of the cable, a messenger strand may be assembled with the telephone cable. The messenger strand is held in parallel relationship with the telephone cable core and at a predetermined distance therefrom by a jacket extruded over both cable core and strand. The jacket is provided with a web between the messenger strand and cable core to space these elements at the predetermined distance and to provide a structural support member. The telephone cable with the messenger strand may be installed as a unit by placing the composite cable between telephone poles or other supporting structures. Adjacent lengths are provided with connector assemblies so that the cable lengths can be coupled together by simple plug-in connections when strung.

The connectors applied to the ends of a cable comprise a plug and a mating receptacle. The receptacle and plug are provided with mating housing bells having an integral neck for receiving the telephone cable.

The receptacle is provided with a plurality of pin contacts set in a semi-rigid insulation medium (e.g. semi-hard rubber). An integral resilient insulator backing (e.g. soft rubber) is provided on the hard insulation so that the individual conductors can be coupled to the pin connectors after passing through the resilient insulation which engages each conductor in a moisture-tight seal.

The plug is provided with a plurality of socket contacts set in rigid insulation to position the contacts to mate with the corresponding pin contacts of the receptacle. As explained in connection with the receptacle construction, a resilient backing is applied to the semi-rigid insulator to engage each conductor in a moisture-tight seal as the conductor is passed therethrough to the individual sockets.

The plug and receptacle are provided with relatively large cups which are charged with a viscous insulating compound such as a silicone compound prior to mating. When the plug and receptacle are mated, the compound is placed under pressure. Small flow passages provide space through which the excess compound flows. The pressure gradient established in the moving viscous mass will eject any air bubbles entrapped therein, ensuring that the space between adjacent contacts are filled with compound. In this manner, the requisite breakdown voltages between pins can be obtained within a connector of small size.

The cable must be suitably clamped with sufficient radial pressure to provide a moisture-tight seal where it enters the neck of the bell housings. Also, it is necessary to provide means for providing electrical continuity between the metallic shields of lengths of adjacent cables. To satisfy both requirements, a metallic, annular sleeve is provided. The sleeve is inserted between the metallic shields and the outer jacket of the cable. A sealing gland is provided in the neck of the housing. After the cable is inserted through the neck of the housing, the gland is compressed axially, expanding the gland into radial engagement with the cable with sufficient force to provide a weather-tight seal. The metallic sleeve allows the requisite high clamping pressure without damage to the cable core components. The sleeve contacts the sheath on the cable. Means are provided to ensure electrical coupling between the sleeve and the housing. Thus, when the receptacle and plug are joined, an electrically conductive path is provided between the shields of adjacent cable lengths.

In addition to providing a weather-tight seal, the engagement of the gland with the cable jacket, under the high pressures possible when the jacket is supported by the sleeve, provides a mechanical bond between the cable jacket and the connector housing so that the jacket cannot be pulled out of the connector housing.

To enable pressurizing the telephone cable with a positive gas pressure, both the receptacle and plug assemblies are gas tight and are provided with gas fittings so that a jumper pipe may be coupled between receptacle and plug to transmit the gas pressure in one cable length to the adjacent cable length. The jumper may be installed on non-pressurized cable systems to equalize the pressure between cable lengths and, thus, to prevent internal pressures (e.g. due to temperature deficiencies) from extruding the insulating compound from the connector.

To install the cables constructed in accordance with this brief description, the crews need merely string the cable, plug in adjacent lengths of cable and install a gas jumper pipe between connectors when needed. The composite cable is strung in a single operation to install both the messenger strand and telephone cable and adjacent lengths similarly joined.

When it is desired to install components, such as loading coils or repeaters between adjacent cable lengths, the component is prewired at the factory and encased within a sealed container. The component is then installed within the telephone system merely by plugging the cable lengths into the component, or into stub cables provided externally of the container, or to connectors mounted on the container. Similarly, if a main telephone line is to be branched, the branch connection may be made and encased within a sealed container having stub connectors. The adjacent cable lengths may then be plugged into the stub connectors to provide the branch separation of the conductors into the desired branching.

To perform the necessary testing of the installed system, a test panel assembly is provided for each of the common cable sizes. The assembly consists of a test panel having a plurality of test jacks corresponding to the number of conductors in the cable core. At the factory, each conductor is connected to a jack, and the conductor plurality bundled into two stub cables having a receptacle on one and a plug on the other. Thus, when it becomes necessary to test the telephone cable system, it is easily accomplished merely by plugging adjacent lengths of cable into the test panel assembly. The individual conductors may then be tested by tapping to the individual jacks. Thus, opening the cable proper is avoided and the cable integrity is always maintained.

Having briefly described the invention, it will be described in more detail along with other objects and advantages thereof in the following detailed description, which may be more easily understood when taken in combination with the accompanying drawings, of which:

Figure 1:
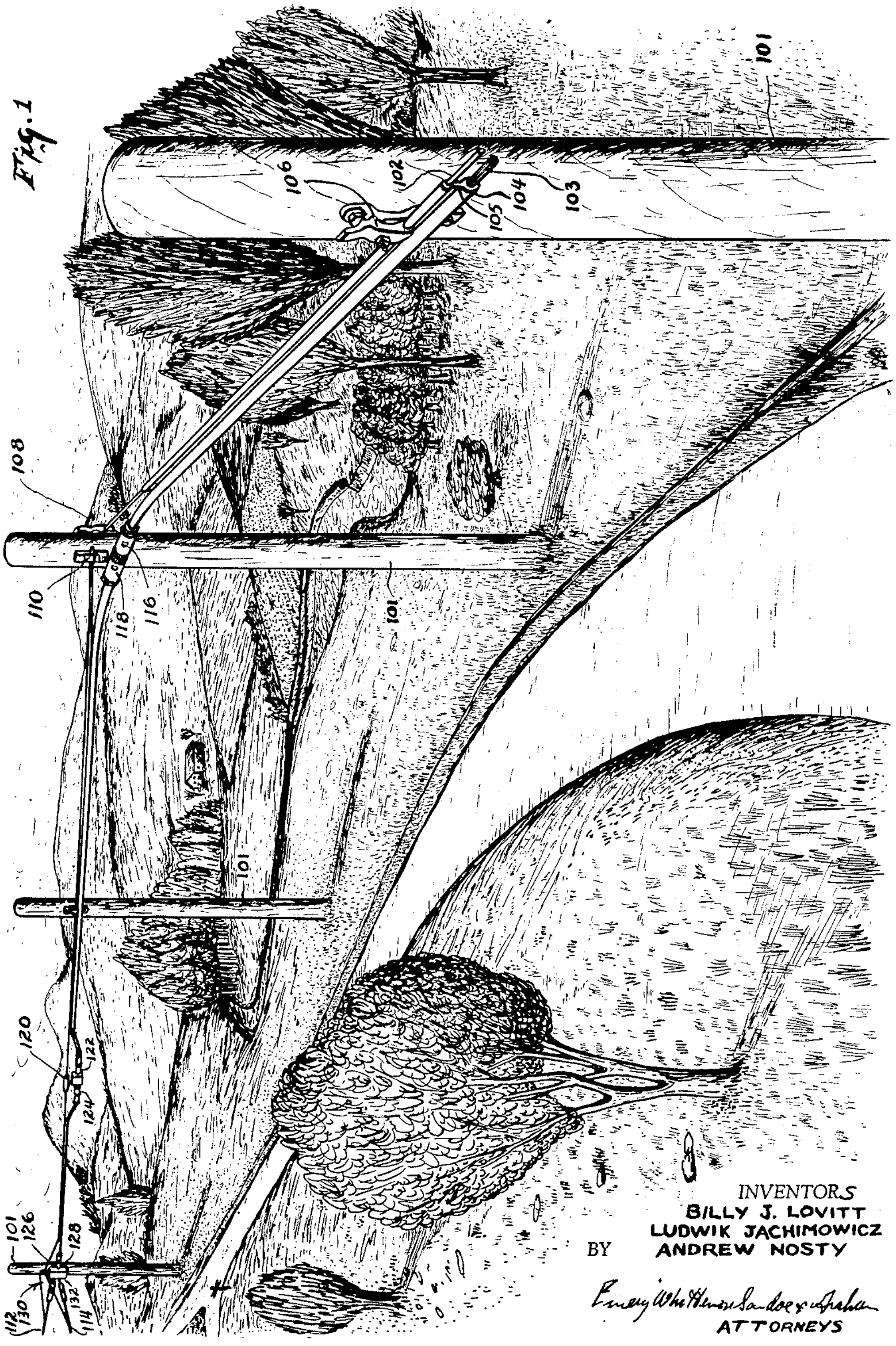
FIG. 1 is a perspective view of a telephone cable system constructed in accordance with the present invention.

In FIG. 1 there is shown a telephone cable system in accordance with the present invention.

Figure 8:
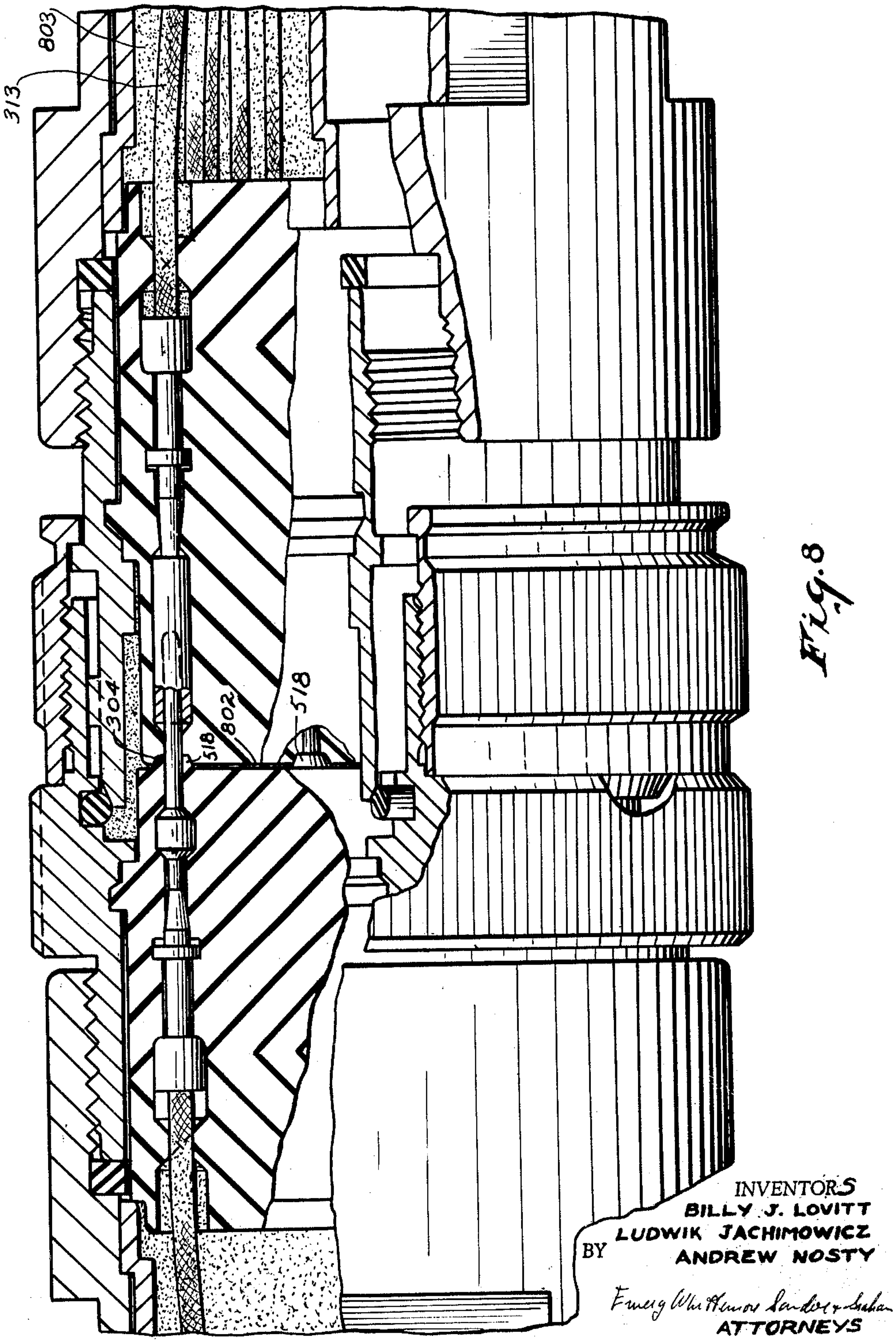
FIG. 8 is an enlarged partially sectioned view of a portion of the connector shown in FIG. 2.

The telephone cable illustrated is figure 8 Type composite cable in the manufacture of which a messenger cable 102 and the telephone cable 103 are enclosed within a common jacket 104. The web 105 between the messenger and telephone cables determines the spacing between the two cables and supports the telephone cable when the messenger cable is affixed to the poles 101.

The messenger strand is conventionally stranded, galvanized steel cable and is attached to the poles by a clamp 106 clamped over the messenger and the jacket. Also, at the ends of cable lengths and at poles defining a change in direction of the cable, the jacket may be stripped from the messenger cable and clamped by clamps 108, 110.

The telephone cable 103 comprises a plurality of conductor pairs assembled into a cable, as for example by stranding or cabling. Each conductor is usually a polyethylene insulated solid conductor. The number of conductors varies with the application requirements. The number of conductor pairs of interest to this application may be 6, 10, 12, 25, 50, 100, 150, 200, 300, or 400 pairs, which are conventional cable sizes covering the majority of local telephone systems.

The telephone cable may be branched into two or more smaller cables as in 112, 114 to provide telephone service to divergent locations.

Unlike conventional cable, however, the cable made in accordance with this invention is provided with an integral connector on the ends thereof. The connector comprises a plug assembly 116 on one end of each length of cable and a mating receptacle assembly 118 on the other end. Thus, to cut the cable into service, lengths are strung and adjacent lengths merely plugged together.

In this manner, field jointing of the pairs of adjacent cable lengths is eliminated, and the cable may be cut into service, as rapidly as the cable is strung. In addition to vastly increasing the overall speed of installation, the cable can be put into service virtually as rapidly as it is strung, eliminating the unproductive capital investment in telephone cable which may be strung up but left unjoined for as long as several months under present practices.

Further, since the connectors may be affixed to the cable under controlled manufacturing conditions, the added hazard, expense and inducement toward error caused by operations under uncontrolled field and climatic conditions is eliminated.

When it is necessary to insert components, such as loading coils or repeaters 120, they may be installed by assembling the components within weatherproof containers in the factory and plugging the telephone cable directly into the stub cable 122, 124 connected to the component. Usually, the components are light and may be suspended directly from the cable. If the component is heavy, it is advantageous to mount the component on a pole and to provide a long stub cable to reach the cable end. Similarly, when it is desired to branch the cable system as, for example, into branches 112 and 114 from the central cable 103, a branching network 126 may be provided within a weatherproof housing. The cable system is then run to the branching network 126 which may conveniently be mounted directly on the pole and plugged into a stub cable 122 extending therefrom. The branches 112 and 114 are then merely plugged respectively into stub cables 130 and 132 to complete branching of the telephone cable system.

Thus, by this system there is provided a telephone cable system which may be rapidly and conveniently installed and be put into operative condition. Since jointing of adjacent cable lengths in conventional manner is eliminated, there is no necessity for providing the skilled jointing crews common with the present practice. Further, since the act of connection is merely that of assembling connectors, adverse weather will have little effect on the jointing operation. Thus, there is no necessity for building enclosing shelters at each joint.

Similarly, when branching the line simple factory wired assemblies may be utilized and the laborious hand separation of conductors in the field need not be resorted to. Other operative components, such as loading coils and repeaters, can be installed simply by plugging the cable into factory wired assemblies.

Also, should the cable system require testing, the connectors joining adjacent lengths near the suspected malfunction are separated and plugged into stub cable connections to a test instrument, which will be explained in detail subsequently. Thus, the system can be checked easily and efficiently since the cable core need not be opened to obtain access to the core components as is true with presently-used cable.

While composite cable of the FIGURE 8 type has been illustrated, conventional messenger strand can be employed and telephone cable having installed connectors suspended therefrom.

Similarly, the components may be factory wired, and encased within sealed containers.

The connectors on both the components and the cable are provided with an end cap to seal the connector components during shipment and installation of the cable. The end caps may be of conventional construction to close the open end of the plug and receptacle in a weathertight seal. During installation, the seal is removed and the coupling made merely by plugging together the corresponding plug and receptacle.

The connectors in the telephone system above described must be of small size so that they can be conveniently handled, shipped and reeled when on the ends of cable lengths. However, since telephone cable is designed for a long, useful life, the connectors must have commensurate life expectancy. The life expectancy must be provided despite the fact that the connectors are exposed to extremes of climatic conditions. Further, since telephone lines may be hit by lightning, the conductor-to-conductor voltage breakdown must be maintained at an extremely high value, such as 10,000 volts. The connector obviously must not deteriorate the cable conditions. Thus, conventional connectors, such as the conventional miniature multi-pin plug and receptacle assemblies used in aircraft work, will not be suitable for this application. The connector offering the requisite electrical and mechanical characteristics is shown in FIGS. 2–10.

In FIGS. 2–10, there is shown the connector assembly comprising the plug assembly 201 and mating receptacle assembly 202. The plug and receptacle assemblies are coupled together in weather-tight engagement by a lock ring 203. The cables are inserted through the annular opening in the end of the assembly and the nut 204 is tightened to mechanically secure the connector to the cable in a weatherproof seal. The housing is provided with wrench flats 205 so that wrench pressures may be used to tighten the nut 204.

Figure 2:
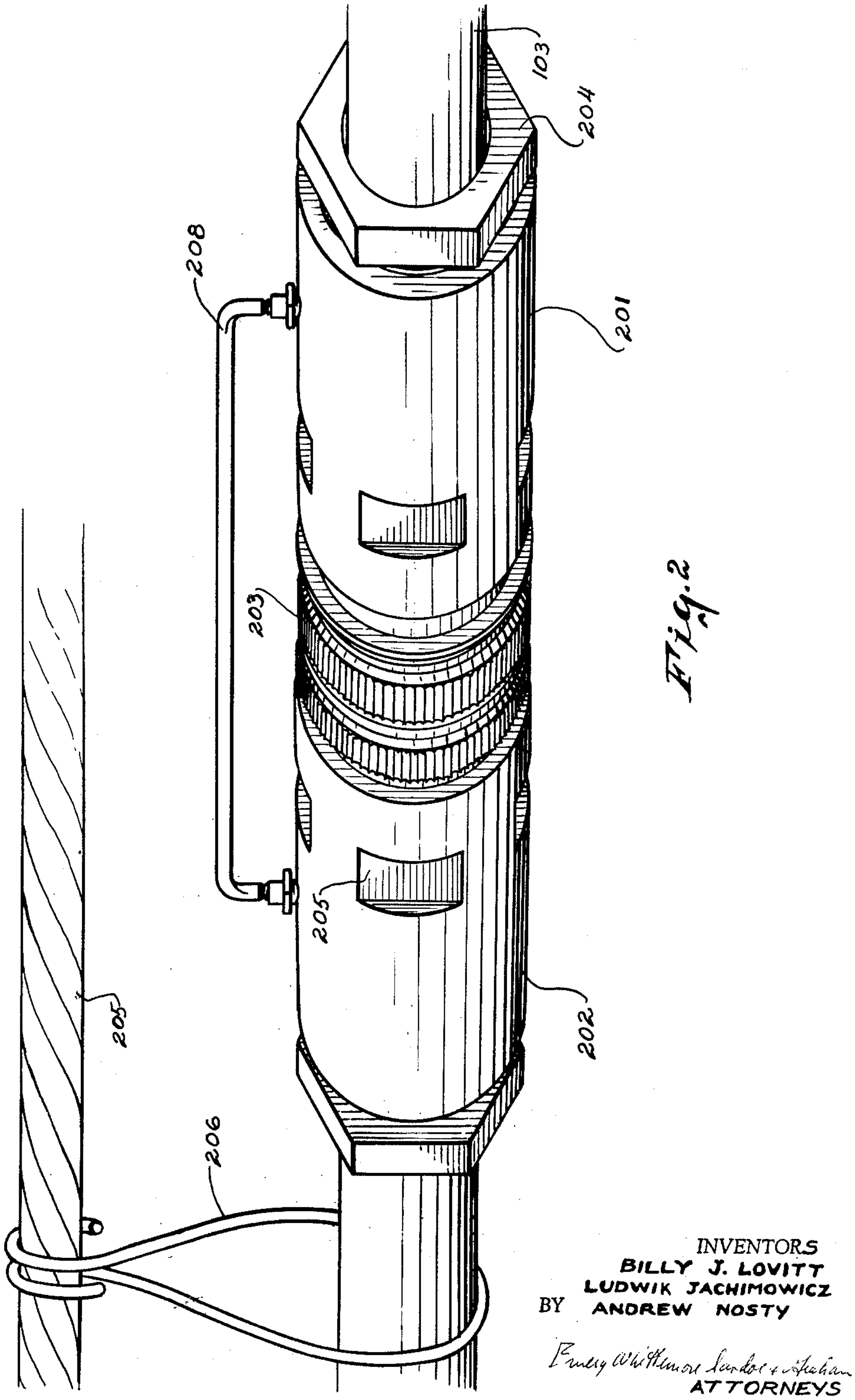
FIG. 2 is an enlarged perspective view of the connector used in the system of FIG. 1, showing an alternative form of cable stringing.
Figure 3:
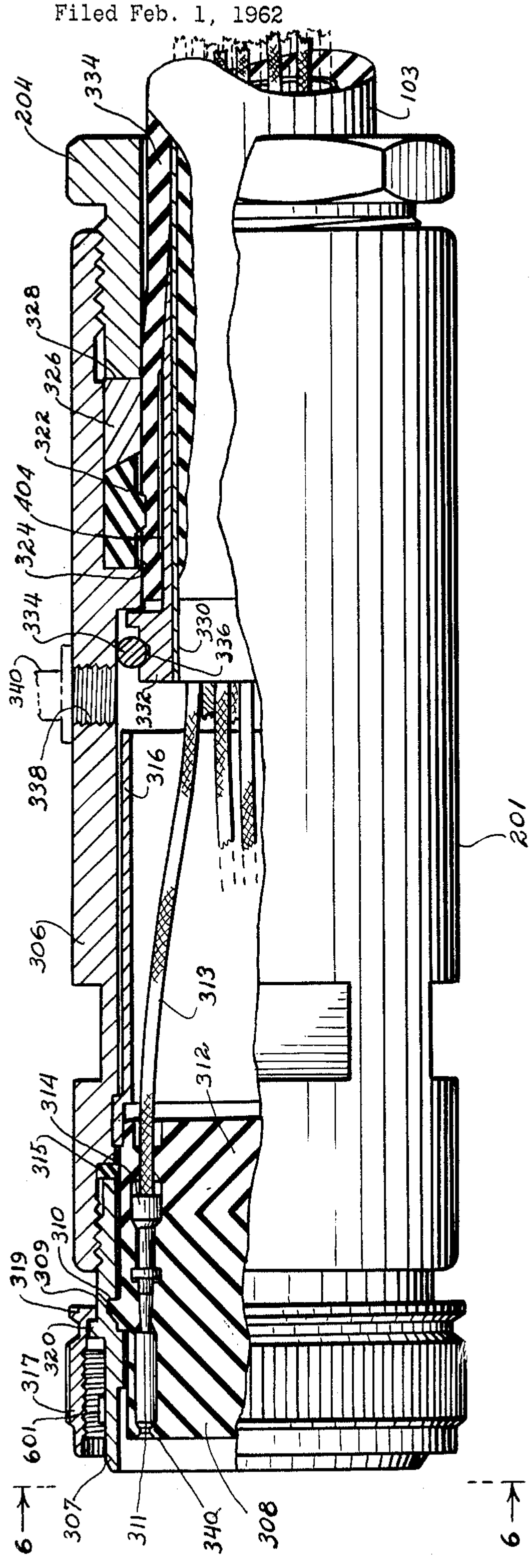
FIG. 3 is a partially sectioned view of the portion of the connector shown in FIG. 2.
Figure 4:
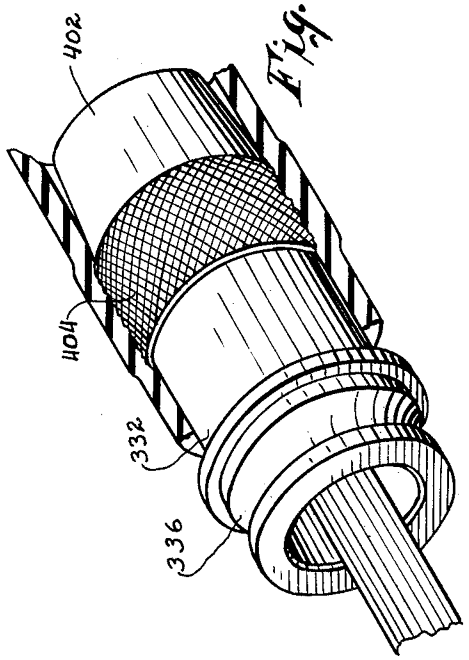
FIG. 4 is a partially sectioned view of a portion of the plug shown in FIG. 3.

In FIG. 2 the telephone cable illustrated is a separate cable suspended from a messenger cable 205 by clips 206 in conventional fashion.

The construction of the plug and receptacle are best seen by reference to FIGS. 3–7. As will be noted, common parts are used in plug and receptacle and such common parts have been identified by the same reference numeral.

The plug assembly 201 comprises an end bell 306. The end bell is a hollow cylindrical housing having a threaded end to receive barrel 307 in threaded engagement therewith. A socket contact mounting block 308 is mounted within the plug barrel by the insertion of shoulder 309 within the annular groove 310.

The contact mounting block is preferably formed of semi-rigid insulation material to positively locate the individual socket contact 311. The socket contact is preferably a copper alloy machined part over which is plated silver and/or gold for low contact resistance. A soft, resilient member 312 is molded to the mounting block to grip the conductors passing therethrough in a moisture-proof seal. It has been found preferable to construct the mounting block and resilient backing as an integral unit of dual hardness plastic material.

The individual conductors 313 of the telephone cable are attached to the individual socket contacts in conventional fashion by crimping the end assembly 314 of the individual contacts over the inserted bared wire. The socket assembly is then inserted in position within the mounting block 308. The hard rubber maintains the mechanical position of the socket contact and the soft rubber 312 engages the conductor 313 to provide a moisture-proof barrier preventing the entry of water into the contact assembly.

When the barrel is inserted within the end bell, a moisture-proof seal is provided by the resilient annular washer 315. An annular insulator 316, such as a dielectric tube, is provided within the end bell to ensure that the individual conductors are insulated from the metallic housing of the end bell.

A coupling nut 317 is provided with an internal thread to engage the external thread 418 on the receptacle. The flange 319 engages the shoulder 320 to draw the plug and receptacle together when the nut is tightened.

The telephone cable 103 is inserted within the aperture in the end of the bell housing. A packing gland 322 is provided which is located between shoulder 324 and an axially displaceable ferrule 326. When the nut 204 is tightened, the force exerted on the wedge by the shoulder 328 will move the wedge to compress the gland axially, expanding the gland radially into mechanical engagement with the cable.

In order to provide a rigid surface upon which the compressed packing gland will bear when tightened and simultaneously to provide a means for coupling the ground shield 330 of the cable to the body of the plug, there is provided an annular sleeve 332 which is inserted between the metallic shield 330 and the outer jacket 334 of the telephone cable. The sleeve 332 has a generally cylindrical body having a tapered end portion 402. On the outer surface there is provided a knurled section 404. To insert the sleeve in the cable, the polyethylene jacket of the cable is heated and the sleeve slipped under the jacket. Upon allowing the jacket to cool, it will shrink over the sleeve to provide a firm mechanical grip thereon. The sleeve is metallic to provide electrical contact to the metallic shield on the cable.

The gland 322 is compressed over the knurled section 404 of the sleeve to clamp the cable jacket between the sealing gland and the knurl. Since the sleeve is rigid, the clamping pressure on the jacket is high, thus, isolating the individual contacts 311 from tensile stresses imposed on the cable.

In order to provide an electrical connection between the sleeve and the bell of the receptacle, a corrugated or toroidal formed spring 334 is provided which is inserted in the groove 336 on the sleeve. The corrugations ensure electrical contact between the sleeve and the housing. Thus, it will be seen that the protective shielding of the cable is maintained continuous between adjacent cable lengths through the connector assembly when the plug and receptacle portions are mated.

To exclude entry of moisture and air, the receptacle and plug are hermetically constructed. However, to make the connector suitable for use with pressurized cable as well as to prevent localized rises in internal pressure of non-pressurized cable, the end bell 306 is provided with a threaded aperture 338 to receive a gas coupling 340. A hollow pipe 208 may be coupled between plug and receptacle to equalize the internal pressure in adjacent lengths of cable and to provide a passage for flow of inert gas or other pressurizing media.

Figures 5, 9:
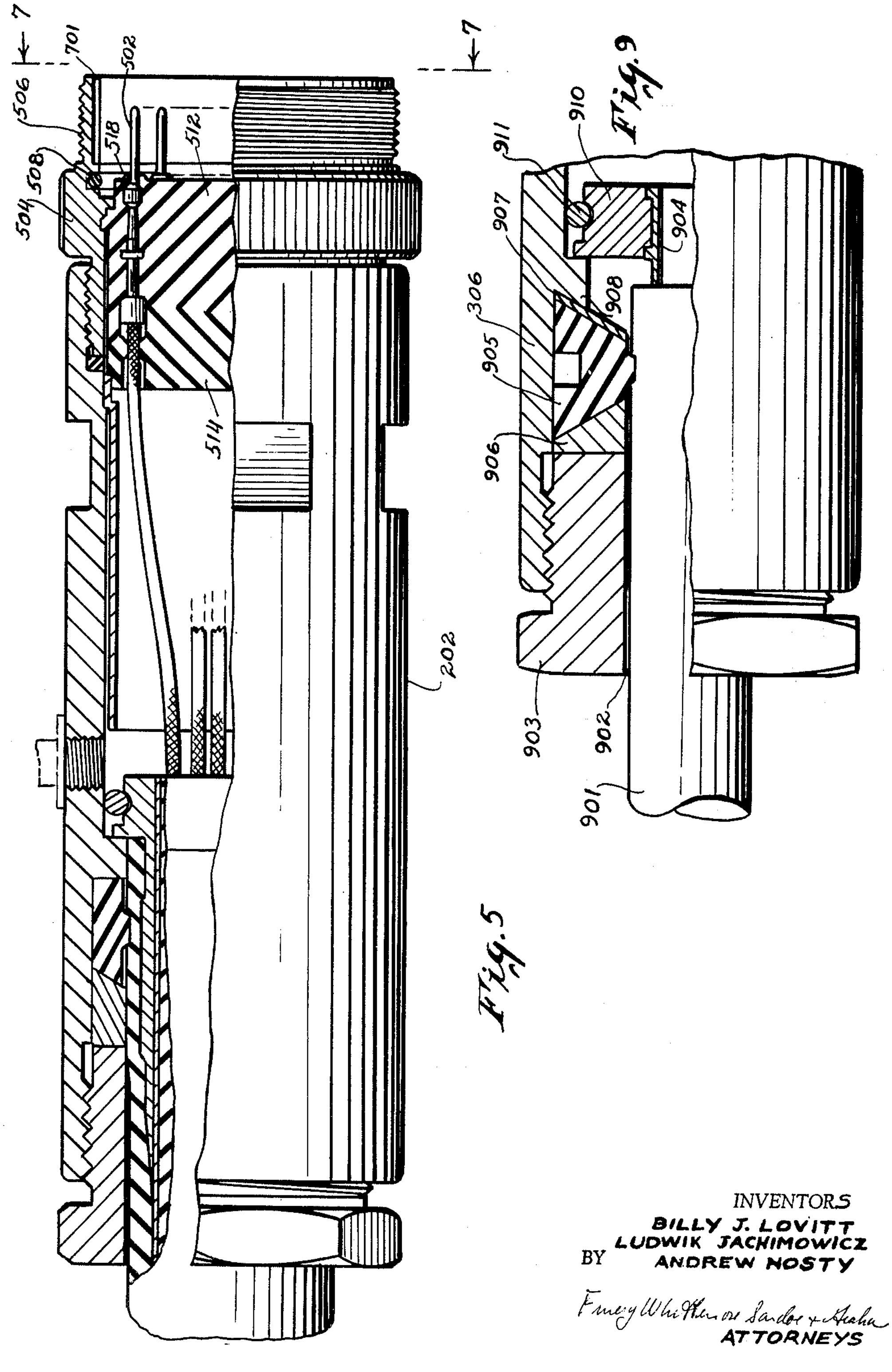
FIG. 5 is a partially sectioned view of the receptacle portion of the connector shown in FIG. 2.
FIG. 9 is a partially sectioned view of a portion of the receptacle shown in FIG. 5 in accordance with another embodiment of the invention.
Figure 6:
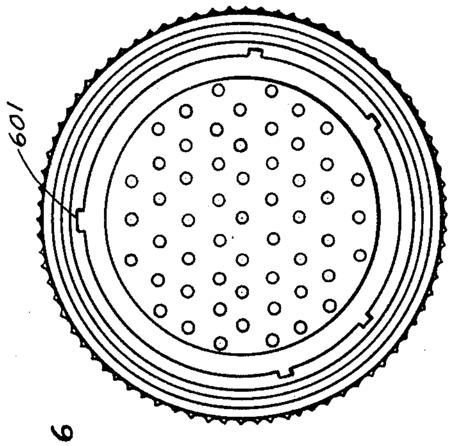
FIG. 6 is an elevation view at lines 6—6 of FIG. 3.

The receptacle portion is constructed in similar manner as indicated by the use of like reference numerals in FIG. 5. The plug 242, however, is provided with protruding pins 502 and the barrel 504 is provided with an external threaded surface 506 to receive the lock ring 503. An annular gasket 508 is provided to engage the end of the plug barrel in sealed engagement when the connector is joined. The individual conductors are secured to the respective pins by crimping the pins in conventional manner. The pins are lodged in the harder portion 512 of the pin mounting plug. The conductors themselves then pass through the softer portion 514 of the plug which encases the conductor 516 in a moisture-proof seal. The soft part of the insulator is of such consistency as to provide a seal for various sizes of polyethylene insulated conductors.

Surrounding each pin there is provided an annular barrier 518. The annular barrier 518 engages the corresponding recess 340 around each contact in the plug assembly thereby to lengthen the surface tracking path between adjacent pins. As previously explained, the barrier may be omitted in many applications.

When the plug and receptacle are assembled, the space between mating faces of the plug and receptacle is filled with an electrical insulating compound, such as silicone grease from which air bubbles are removed. For convenience of explanation, the preferred manner of removing entrapped air is explained in detail in following portions of this specification. Thus, when assembled, adjacent contacts are completely isolated one from the other by the combined action of the coaction between the barriers 518 and the mating recesses 340 and (insulating compound) which fills the gap between the faces. In this manner, pin-to-pin breakdown voltages of over 10,000 volts may be achieved with a pin-to-pin separation distance of about. .063 inch, an impossibility with air gap insulation between contacts.

It is also advantageous to apply insulating compound 308 to the conductors 313 at the entrance to the dual hardness mounting block to augment the moisture barrier afforded thereby.

Matching keys 601 and keyways 701 are provided respectively in the plug and receptacle housings to ensure proper alignment of the socket and pin contacts.

The connector constructed in accordance with the present invention is compatible with cable sizes usually encountered in the anticipated applications. To provide a proper mechanical and moisture seal to each cable size, the terminal unit and packing gland sizes alone must be changed. For example, use with a smaller diameter cable is shown in FIG. 9.

In FIG. 9 there is shown the end bell 306. The cable 901 enters the open end of the bell 306, through the aperture 902 in the sealing nut 903. A sleeve 904 is slipped under the cable jacket as set forth in detail in consideration of FIG. 4.

An annular packing gland 905 is positioned between a ferrule 906 and a conical washer 907 which bears on shoulder 908. The gland will expand radially to clamp the cable jacket when nut 903 is tightened. The advantage and operation is the same as explained in connection with the embodiment shown in FIG. 3. However, the packing gland is thicker to provide a central aperture approximating the cable diameter. To provide the desired electrical connection between the sleeve and the connector housing, there is provided a split ring 910 and a corrugated or torroidal formed spring 911 to complete electrical contact between sleeve 904 and the bell housing 306.

Figure 10:
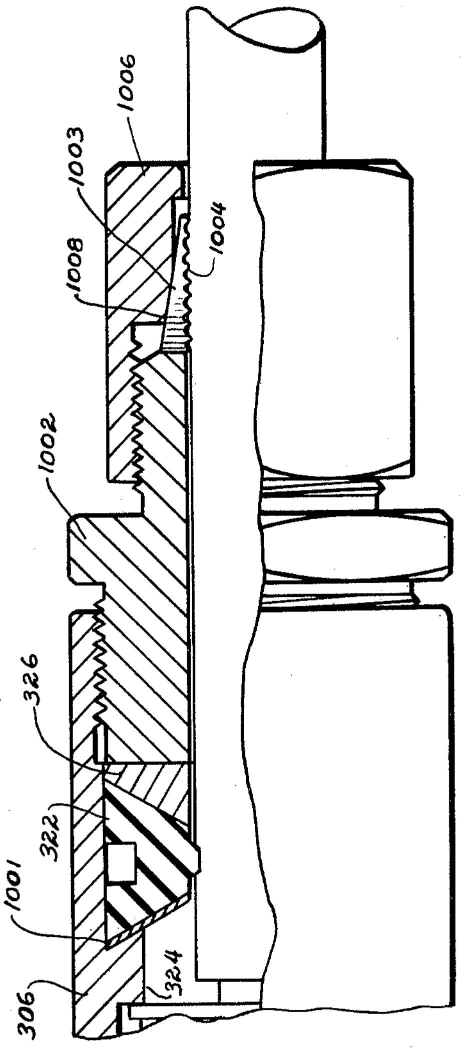
FIG. 10 is an enlarged sectional view of an alternative cable clamp used with the connector shown in FIGS. 3, 5 and 8.
Figure 7:
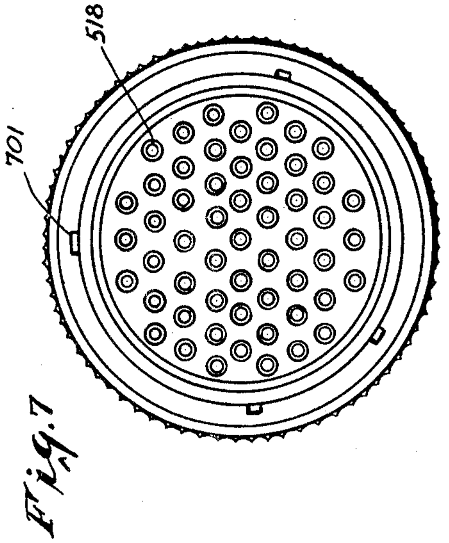
FIG. 7 is an elevation view at lines 7—7 of FIG. 5.

In those applications where it is necessary to further increase the resistance to tensile stress on the cable, the coupling arrangements shown in FIG. 10 may advantageously be employed.

In FIG. 10 there is shown the end of the bell housing 306 having a packing gland 322 secured between an axially displaceable ferrule 326 and washer 1001 which is located by shoulder 324. Clamping pressure may be applied to the gland through the ferrule by rotation of the cable clamp assembly 1002 which will move the assembly linearly along the cable lengths through cooperation of the threads thereon with the internal thread applied to the bell housing. Compression of the clamping gland will apply a clamping pressure to the periphery of the cable jacket to clamp the jacket between the gland and the sleeve inserted under the jacket. In this manner, the clamp functions in a fashion similar to that explained in connection with the embodiment illustrated in FIG. 3.

However, the end of the clamp assembly is provided with tines 1003 having an internal serrated surface 1004. The outer surface of the tines is inclined so that the tines assume a wedge-like shape. When the nut 1006 is secured to the end of the adaptor through cooperation of the internal threads thereon with the external threads on the end of the clamp assembly, the shoulder 1008 of the nut will bear on the inclined surface of the gripping tines to deflect the tines inwardly into gripping engagement with the cable jacket. In this manner, there is applied an additional gripping force to the cable thereby improving the mechanical gripping of the cable by the connector. Thus, any tensile stress applied to the cable is taken up in the gripping elements and is not applied to the individual contacts in the receptacle or plug.

For cable installation, therefore, the cable need merely be strung up and the adjacent lengths plugged together. The line is installed as it is strung and is capable of immediate use. Thus, the capital investment in cable lines may earn a return promptly upon installation thereof.

Since the receptacles and plugs are installed under controlled factory conditions, the manufactured cable lengths may be had at considerable savings in cost over field installations.

The components necessary for completion of the telephone system, such as loading coils, repeater amplifiers, and junctions, may similarly be wired in hermetically sealed containers at the factory and installed by plug-in connection when stringing the cable. For example, branches can be made using the branch component assembly shown in FIG. 11.

Figure 11:
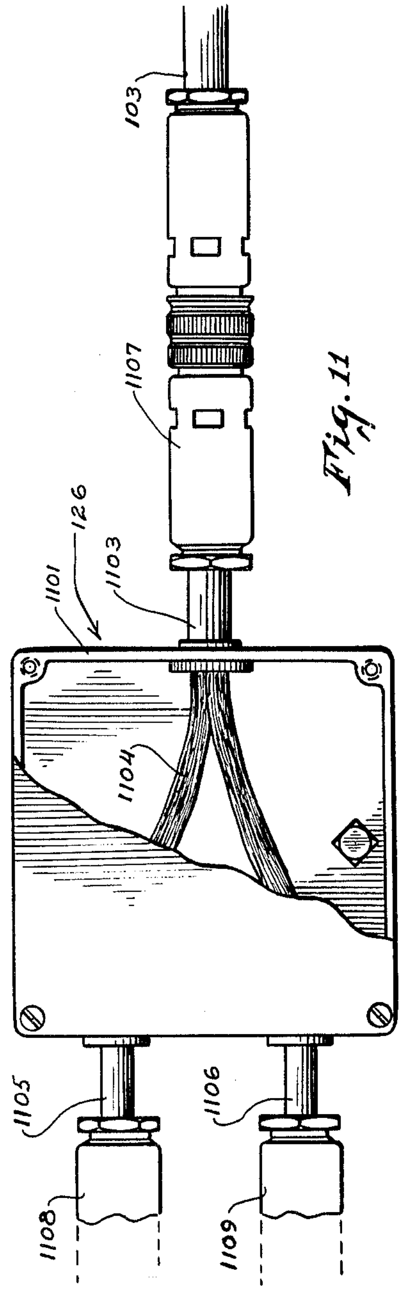
FIG. 11 is a partially sectioned enlarged view of the junction box shown in FIG. 1.

In FIG. 11 there is shown a branching component 126 which comprises a prewired assembly encased within a hermetically sealed box 1101. A stub telephone line 1103 is provided having the number of conductor pairs corresponding to a main cable, such as 50 pairs. The conductors 1104 are split internally into smaller stub cables 1105 and 1106, of 25 conductor pairs each. Each stub cable 1103, 1105 and 1106 is provided with a corresponding connector, such as receptacle 1107, and plug 1108 and 1109 respectively. Thus, to branch the telephone line, the main cable 103 is merely plugged into the main stub and branch cables plugged into the branch stubs.

Similarly, repeaters, loading coils and the like may be prewired and quickly installed. Branches to a plurality of cables instead of the two cables illustrated may be accomplished.

Thus, there is eliminated the tedious process of separating the conductors by opening the cable, protecting the cable integrity during separation, and re-covering the cable branch.

Figure 12:
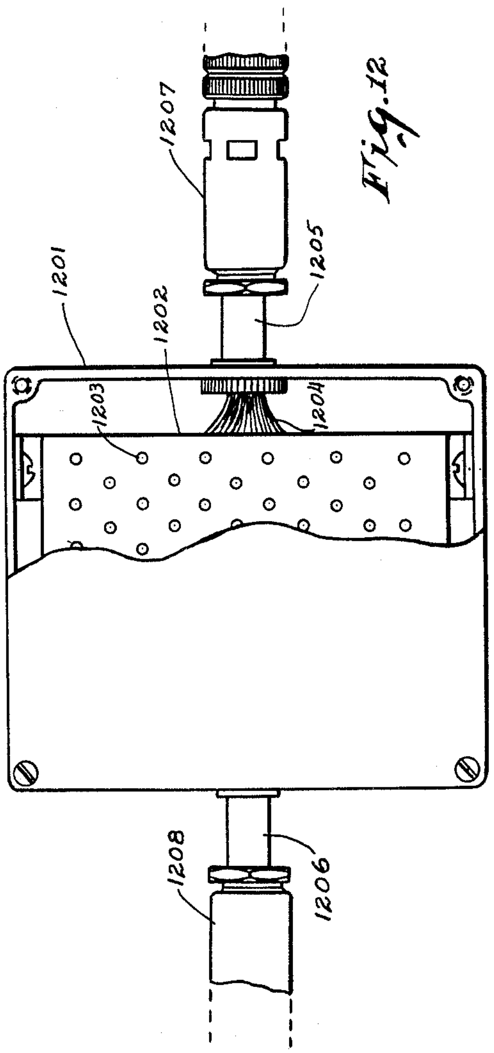
FIG. 12 is a partially sectioned enlarged view of a component used in the system of FIG. 1.

To test the cable system, the test panel shown in FIG. 12 may advantageously be employed.

In FIG. 12 there is shown a test assembly 1201 having a test board 1202 with a plurality of jacks 1203 thereon. Each conductor of the cable 1204 is coupled to one jack 1203. The conductors are bundled into stub cables 1205 and 1206 to which are attached receptacle 1207 and plug 1208 respectively.

Thus, to test the installed system, the connector near the suspected failure need merely be uncoupled and plugged into the stub cable connector on the test assembly.

Access to the cable conductors is thus afforded without violating the integrity of the cable insulation, as was often necessary with telephone systems of the prior art.

As mentioned previously when the connector is assembled, the space between the mating faces of the plug and receptacle and thus, the space between adjacent contacts must be filled with an insulating compound which is free from entrapped air bubbles. For telephone cable of the sizes indicated, the connector must be made small and of the so-called "miniaturized" format. In such a connector, the distance between contacts must be commensurately small (0.151–0.200 in. pin-to-pin separation on the axis; 0.060–0.090 in. pin-to-pin separation of the surface). The dielectric strength of an air gap of this magnitude is of the order of 2500 volts A.C. which is far below the required 10 k.v. D.C. breakdown strength. It will be recognized that any air bubble entrapped in the insulating compound applied between the mating faces of the plug and receptacle will become flattened as the plug and receptacle are mated. This flattening increases the effective size of the bubble and adversely affects the breakdown voltage from pin to pin.

Elimination of air bubbles entrapped within the insulating compound could, of course, be effected by relatively sophisticated means such as application of the compound and mating of the connector under high vacuum. However, such sophisticated methods would obviate the simplicity and economy of system installation.

Figure 13:
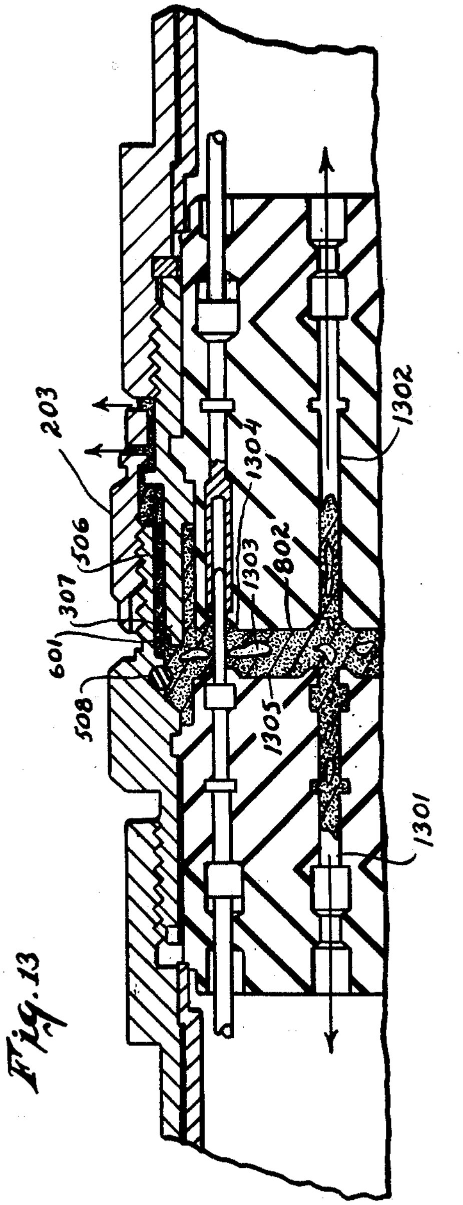
FIG. 13 is an enlarged section view of a portion of the connector shown in FIG. 3 as the connector is formed.

For this reason, the receptacle and plug is provided with relatively large cups defined by the elements 307 and 506 on the receptacle and plug respectively. For the purpose of explaining the operation, reference is made to the detailed FIGS. 13 and 14. Before joining, the cups are charged with sufficient insulating compound, such as a silicon grease to overfill the cups. For example, 4 to 5 ml. of an insulating compound may be charged therein. No effort need be made to distribute the grease or to insure that the grease is free of bubbles entrapped therein, since the bubbles will be expelled in the manner detailed below. As the receptacle and plug are mated, as shown in FIG. 13, tightening of the ring 203 will cause the plug and receptacle to be drawn together. The compound 802 is forcibly distributed over the mating faces. The excess compound is extruded through the keyways 601. Some compound may also be extruded through the contact mounting holes 1301 and 1302. At least one blank contact mounting hole is provided in the plug and receptacle for this purpose. Initially, the major flow of compound will take place through the keyway since this provides a large escape aperture.

Figure 14:
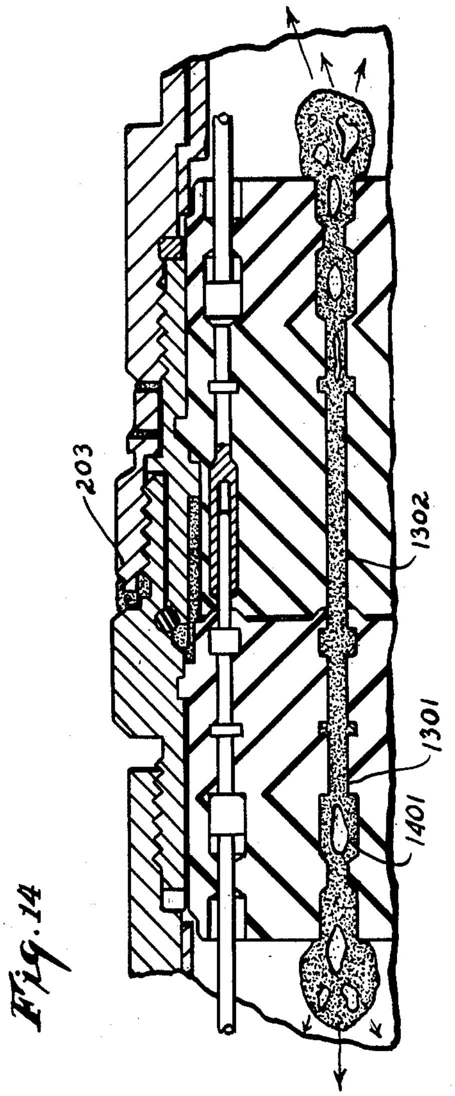
FIG. 14 is an enlarged sectioned view of the connector portion shown in FIG. 13 as the connector is mated.

However, as the gasket 508 is engaged, as shown in FIG. 14, continued tightening of the coupling nut 203 will force contact flow through the open contact mounting holes 1301 and 1302 as is best shown in FIG. 14. The flow of the viscous insulating compound will cause the ejection of any air bubbles entrapped in the compound.

As the viscous compound is extruded from between the mating receptacle and plug, it will, of course, develop a differential pressure gradient throughout the compound ranging from the highest pressure between the mating faces gradually decreasing along the path of flow to atmospheric pressure. The pressure gradient is created by the internal friction of the viscous fluid as well as the friction between the fluid and the closely spaced walls defining the flow path. Any bubbles, such as bubble 1303, entrapped within the compound will be flattened out by the pressures enclosed thereon as the plug and receptacle are mated. The bubble 1303 thus extends between positions of different pressures. The pressure at the leading edge 1304 will be lower than at the trailing edge 1305, since the compound is flowing vertically upwardly. However, a gas bubble has low internal friction and low mass which will preclude the development of a differential pressure across the bubble. Therefore, the high pressure at the back end of the bubble will be transmitted to the front of the bubble resulting in an accelerating force being applied thereto which will move the bubble faster than the compound stream in which it is suspended.

Therefore, as the excess compound is extruded, the air bubbles entrapped therein will be expelled to the atmosphere through keyway 601 faster than the movement of the compound. To insure positive displacement of all air bubbles, the contact apertures 1301 and 1302 are provided. When the receptacle contacts the gasket 508, the remaining compound between mating faces of the plug and receptacle will be extruded through the apertures 1301 and 1302. As explained, the bubbles 1401 will be extruded faster than the movement of the stream of compound in which they are suspended.

The two tubular plugs of compound in the contact mounting holes 1301 and 1302 provide the connector with a reservoir of insulating compound to compensate for daily expansion and contraction of the compound between the mating faces of the plug and receptacle during temperature changes. Further, these plugs prevent moisture from entering between the mating faces of the plug and receptacle.

Thus, there is provided by this invention a weathertight coupling receptacle and plug capable of providing the necessary long service life under exposed environmental conditions. The receptacle similarly provides a very high breakdown voltage between adjacent pins which is necessary for telephone cable systems exposed to lightning surges. The telephone system in accordance with this invention includes the lengths of cable prewired with the necessary coupling receptacles and plugs so that adjacent lengths may be quickly and easily installed in the field to give a finished cable system which is installed at a rate approximating that of stringing conventional cable, which after stringing, must still be jointed.

The components required in such systems, such as loading coils, repeaters, test panels and branch connectors, are prewired in assembled units at the factory and are installed merely by plugging the adjacent lengths into the matching connectors.

The preferred embodiment of the invention has been illustrated and described, but changes and modifications can be made and some features can be used in different combinations without departing from the invention as defined in the claims.

What is claimed is:

1. A telephone line comprising a plurality of lengths of multi-conductor cable, each of said cable lengths comprising a plurality of telephone conductor pairs encased within a shield and a jacket, a plug on one end of said cable, said plug having a plurality of socket contacts, each of said telephone conductors being coupled to a socket contact in a predetermined pattern, a receptacle on the other end of said cable, said receptacle having a plurality of pin contacts to engage said socket contacts in the plug of another cable length, said pin contacts being spaced close together and having a pin-to-pin air gap breakdown strength of the order of 2,500 volts, each of said telephone conductors being coupled to a pin contact in matching predetermined pattern, said receptacle and said plug being securely attached to the jacket of said cable length in a pressure tight seal thereto, said receptacle and said plug being electrically coupled to said shield, the plug on one cable length being coupled to the receptacle in the next cable length to couple the conductors in said lengths together in a water and air tight connection, said coupling electrically connecting the shields of said coupled cable lengths, an insulating compound positioned between mating plugs and receptacles and filling the space therebetween with a bubble-free mass so that the conductor-to-conductor breakdown voltage exceeds 10,000 volts, means preventing the formation of voids in said mass, and means for equalizing the internal pressures in said cable lengths to prevent displacement of said insulating compound from its position between a coupled plug and receptacle.

2. A telephone line in accordance with claim 1 in which said plug and said receptacle are each provided with small apertures pierced from the mating surfaces thereof to a point of atmospheric pressure to provide an orifice through which said insulating compound may be extruded when the plug and receptacle are mated together.

3. A telephone line in accordance with claim 2 in which the compound volume in said small apertures is sufficient to prevent the creation of voids in the insulation compound between mating faces during temperature induced expansion and contraction thereof.

4. A telephone line in accordance with claim 1 which includes an electric component, said component being assembled in a hermetically sealed container, a first and second stub cable, said cables being operably coupled to said component and extending from said container, a plug on said first stub cable, a receptacle on said second stub cable, said component being inserted in said telephone line by coupling the plug and receptacle of said component respectively to the receptacle and plug of adjacent cable lengths.

5. A telephone line in accordance with claim 4 in which said component comprises a loading coil.

6. A telephone line in accordance with claim 4 in which said component comprises an amplifier.

7. A telephone line in accordance with claim 4 in which said component comprises a test panel.

8. A cable in accordance with claim 1 in which each of said plugs and said receptacles is provided with an annular metallic sleeve inserted under said jacket and in electrical contact with said shield, and in which said attachment to the jacket comprises means for applying radial pressure on said jacket over said sleeve to securely attach said jacket to said respective plugs and receptacles.

(References on following page)

References Cited by the Examiner

UNITED STATES PATENTS

| | | | |
|---|---|---|---|
| 1,845,629 | 2/32 | Saylor | 174—88 X |
| 2,428,608 | 10/47 | Bass | 174—35 |
| 2,521,822 | 9/50 | Boswell | 174—91 |
| 2,590,531 | 3/52 | McLoad | 174—70 X |
| 2,700,140 | 1/55 | Phillips | 174—77 X |
| 2,732,421 | 1/56 | Chapman | 174—76 |
| 2,871,283 | 1/59 | Dickins | 174—76 X |
| 2,877,288 | 3/59 | Bollmeier | 174—76 X |
| 2,896,186 | 7/59 | Hardmark | 339—94 X |
| 2,956,311 | 10/60 | Raydt et al. | 174—41 X |

FOREIGN PATENTS

| | | |
|---|---|---|
| 1,092,617 | 11/54 | France. |
| 1,245,074 | 9/60 | France. |
| 82,851 | 6/57 | Denmark. |

JOHN F. BURNS, *Primary Examiner.*

JOHN P. WILDMAN, *Examiner.*